(12) United States Patent
Voelker et al.

(10) Patent No.: US 8,906,548 B2
(45) Date of Patent: Dec. 9, 2014

(54) ACTINIC AND ELECTRON BEAM RADIATION CURABLE ELECTRODE BINDERS AND ELECTRODES INCORPORATING SAME

(75) Inventors: Gary E. Voelker, Bumpass, VA (US); John Arnold, Pittstown, NJ (US)

(73) Assignees: Miltec Corporation, Stevensville, MD (US); Actega Radcure, Inc., Wayne, NJ (US)

( * ) Notice: Subject to any disclaimer, the term of this patent is extended or adjusted under 35 U.S.C. 154(b) by 588 days.

(21) Appl. No.: 12/899,163

(22) Filed: Oct. 6, 2010

(65) Prior Publication Data

US 2011/0081575 A1    Apr. 7, 2011

Related U.S. Application Data

(60) Provisional application No. 61/249,382, filed on Oct. 7, 2009.

(51) Int. Cl.

| | | |
|---|---|---|
| *H01M 4/13* | (2010.01) | |
| *H01M 4/62* | (2006.01) | |
| *H01M 4/04* | (2006.01) | |
| *H01M 4/139* | (2010.01) | |
| *H01G 11/86* | (2013.01) | |
| *H01M 4/1391* | (2010.01) | |
| *H01M 4/1393* | (2010.01) | |
| *H01M 10/0525* | (2010.01) | |

(52) U.S. Cl.
CPC .............. *H01M 4/0404* (2013.01); *H01M 4/13* (2013.01); *H01M 4/139* (2013.01); *H01M 4/621* (2013.01); *H01M 4/622* (2013.01); *H01G 11/86* (2013.01); *H01M 4/1391* (2013.01); *H01M 4/1393* (2013.01); *H01M 4/625* (2013.01); *H01M 10/0525* (2013.01); *Y02E 60/122* (2013.01); *Y02T 10/7011* (2013.01); *H01M 2220/30* (2013.01)
USPC .......................................................... 429/217

(58) Field of Classification Search
USPC ......................................................... 429/217
See application file for complete search history.

(56) References Cited

U.S. PATENT DOCUMENTS

| | | | |
|---|---|---|---|
| 4,218,349 A | 8/1980 | Minatono | |
| 4,600,745 A * | 7/1986 | Creighton | ..................... 524/534 |

(Continued)

FOREIGN PATENT DOCUMENTS

| | | |
|---|---|---|
| EP | 0662728 | 4/1998 |
| JP | 08-124560 | 5/1996 |

(Continued)

OTHER PUBLICATIONS

PCT International Search Report for PCT/US2010/051736, dated Mar. 15, 2011.

(Continued)

*Primary Examiner* — Ula C. Ruddock
*Assistant Examiner* — Jacob Marks
(74) *Attorney, Agent, or Firm* — Dority & Manning, P.A.

(57) ABSTRACT

A process for manufacturing an electrode utilizing electron beam (EB) or actinic radiation to cure electrode binding polymers is provided. A process is also disclosed for mixing specific actinic or EB radiation curable chemical precursors with electrode solid particles, application of the mixture to an electrode current collector, followed by the application of actinic or EB radiation to the current collector for curing the polymer, thereby binding the electrode material to the current collector. Lithium ion batteries, electric double layer capacitors, and components produced therefrom are also provided.

58 Claims, 4 Drawing Sheets

(56) References Cited

U.S. PATENT DOCUMENTS

| | | | |
|---|---|---|---|
| 5,429,891 | A | 7/1995 | Gozdz et al. |
| 5,512,214 | A | 4/1996 | Koksbang |
| 5,521,248 | A | 5/1996 | Drake et al. |
| 5,565,284 | A | 10/1996 | Koga et al. |
| 6,602,766 | B2 | 8/2003 | Chang et al. |
| 6,680,147 | B2 | 1/2004 | Lee |
| 6,743,876 | B2 | 6/2004 | Wille et al. |
| 7,189,477 | B2 | 3/2007 | Mikhaylik |
| 7,338,734 | B2 | 3/2008 | Chiang et al. |
| 7,387,851 | B2 | 6/2008 | Gozdz et al. |
| 7,579,112 | B2 | 8/2009 | Chiang et al. |
| 7,754,382 | B2 | 7/2010 | Kurihara et al. |
| 2005/0026025 | A1* | 2/2005 | Shah et al. ............... 429/35 |
| 2008/0032192 | A1* | 2/2008 | Yokomizo et al. ............ 429/210 |
| 2009/0017323 | A1* | 1/2009 | Webb et al. .................. 428/521 |

FOREIGN PATENT DOCUMENTS

| | | |
|---|---|---|
| JP | H08-124560 | 5/1996 |
| JP | H11-167921 | 6/1999 |
| JP | 11-250916 | * 11/1999 |
| WO | WO 95/29509 | 2/1995 |
| WO | WO 99/63609 | 12/1999 |
| WO | WO 2006/095436 | 9/2006 |

OTHER PUBLICATIONS

Nordstrom et al., "Acrylic Copolymers for Radiation-Cured Coatings", Ind. Eng. Chem. Prod. Res. Dev., 1970, 9(2) 155-158.

Molenaar et al., "Adhesion of electron beam curable coating on metal substrates", Prog. Organic Coatings, 1993, 22:393-399.

* cited by examiner

ACTINIC AND ELECTRON BEAM RADIATION CURABLE ELECTRODE BINDERS AND ELECTRODES INCORPORATING SAME

CROSS REFERENCE TO RELATED APPLICATION

The present application claims filing benefit of U.S. Provisional Patent Application Ser. No. 61/249,382 having a filing date of Oct. 7, 2009, which is incorporated herein by reference in its entirety.

FIELD OF THE DISCLOSURE

The present invention is in the technical field of electrodes as may be utilized in alkali-ion secondary (rechargeable) batteries, and particularly in the technical field of lithium ion secondary batteries, and in electric double layer capacitors and manufacture thereof.

BACKGROUND

Electrochemical devices including batteries and electric double layer capacitors (EDLCs) have found great usefulness in power supplies, including power supplies of portable devices and auxiliary power supplies for automobiles. For example, lithium ion batteries are one of the most popular battery types for use in portable electronics such as phones, music players, portable computers, and so forth. Lithium ion batteries have very high energy-to-weight ratios, no memory effect, and a slow loss of charge when not in use. Lithium ion batteries are also growing in popularity for military, electric vehicle, and aerospace applications due to their high energy density.

The basic working unit of a lithium ion battery is an electrochemical cell. The electrochemical cell includes two electrodes, an anode and cathode, separated and connected by an electrolyte. The anode typically is a thin metal sheet of electrically conducting material, such as copper, which is referred to as the anode current collector and is coated with solid anode material particles. The solid particles are held to the anode current collector and to each other by a binding material, which is typically a polymer which retains adhesion and hardness and does not swell or disintegrate during use. Typical anode particles include carbon (generally graphite) and silicon-based materials. The particle sizes of the anode material coated on the current collector range from several nanometers to several microns in nominal diameter.

The lithium ion battery electrolyte may be liquid, solid or a gel. For liquid electrolytes, a separator is employed to separate the anode from the cathode. A typical separator is a thin porous polymer sheet. Void spaces in the polymer are filled with electrolyte. A typical liquid electrolyte is a mixture of organic carbonates such as alkyl carbonate containing complexes of lithium ions, generally non-coordinated anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), and lithium triflate ($LiCF_3SO_3$). Typical solid electrolytes are polymers. A wide variety of materials may be used as a gel electrolyte. The electrolytes are designed to withstand the voltage between the anode and the cathode, and offer a high mobility of lithium ions without a risk of flammability.

The cathode typically employed in a lithium ion battery includes a thin metal sheet of electrically conducting material such as aluminum, which is referred to as the cathode current collector, and is coated with solid cathode particles. Cathode solid particles are held to the cathode current collector and to each other by a solid polymer binding material, which is typically a polymer produced to retain adhesion and hardness and not swell or disintegrate during use. Typical cathode materials include particles of metal oxides such as lithium, cobalt, manganese, nickel, or vanadium oxides, and other lithium compounds such as lithium iron phosphate. The cathode materials often include a small amount of carbon as well, to improve conductivity, though the carbon will generally not be as graphitic as that of the anode. Particle sizes of the cathode material coated on the current collector range from several nanometers to several microns in nominal diameter.

An EDLC, also known as a supercapacitor or an ultracapacitor, is an electrochemical capacitor that has an unusually high energy density when compared to traditional capacitors. An EDLC includes two separate electrodes of the same construction separated by an intervening substance that provides effective separation of charge despite a vanishingly thin (on the order of nanometers) physical separation of the layers. The electrode of an EDLC employs a current collector, typically a current collector similar to that of a lithium ion battery cathode, such as aluminum. To improve energy storage density a nanoporous material, typically a particulate carbon such as graphite or activated charcoal, is applied to the surface of the current collector with a binder, which is typically a polymer produced to retain adhesion and hardness and not swell or disintegrate during use. The particle size of the carbon generally ranges from several nanometers to several microns in nominal diameter. The pores of the electrode carbon are then filled with the intervening substance, i.e., an electrolyte that is a liquid or a gel. A typical liquid electrolyte is an organic alkyl carbonate that can include selected lithium salts.

A typical process for forming an electrode such as is found in a lithium ion battery or an EDLC includes:
1) The polymeric binding material is formed into a solution with a solvent such that the solution has a suitably low viscosity for application to the current collector after mixing with the solid particles.
2) The low viscosity binding solution is mixed with the electrode solid particles at approximately 20-80 wt. % of the solvent, and particularly approximately 50 wt. % of the solvent to form a paste.
3) The paste is coated in a thin layer (typically 10 to 200 microns) onto the current collector using conventional coating techniques.
4) The coated current collector is passed through a thermal drying oven where solvent is driven off and the binder polymer is set.
5) The electrode is passed through a pair of rotating rollers separated by a narrow gap (e.g. 5 to 200 microns) to compress the current collector coating to a specified thickness.
6) Typically, both sides of the electrode current collector are coated with anode/cathode particles and processed by the aforementioned steps.

There are multiple shortcomings of the aforementioned prior art involved in the manufacturing of electrodes that have a direct effect on the cost of manufacturing. These shortcomings include, without limitation:
a) Solvent used to dissolve the polymer binding material must be vaporized requiring substantial thermal energy input.
b) Substantial energy inefficiencies associated with thermal drying.
c) The vaporized solvent must be recovered and either disposed of or recycled.

d) The oven required for drying the polymer binding material occupies significant manufacturing space at a significant capital cost.

e) The time required to manufacture the electrodes is increased by the time required for the polymer binding material to be dried in the drying oven.

What are needed in the art are improved materials and methods for forming electrodes. For instance, improved binding materials for use in lithium ion cathodes and anodes and EDLC electrodes would be of great use.

SUMMARY

According to one embodiment, disclosed is an electrode including a current collector and a crosslinked polymeric layer adhered to a surface of the current collector. The polymeric layer can include a crosslinked matrix formed of a rubber polymer. For example, the rubber polymer can include monomeric units of isoprene, butadiene, cyclopentadiene, ethylidene norbornene, vinyl norbornene, or combinations thereof. Beneficially, the crosslinked matrix can be formed via actinic radiation or electron beam (EB) curing. As such, the crosslinked matrix can also include a reacted actinic radiation or EB curable crosslinking agent covalently bonded to the crosslinked rubber polymer.

The crosslinked polymeric layer also includes particulate material. The particulate material can be carbon such as graphene, activated carbon, graphite, low sulfur graphite, carbon nanotubes, or combinations thereof. The crosslinked polymer layer can include particulate material such as a metal oxide salt, a lithium compound, or the like.

Electrodes can optionally be held adjacent to additional layers such as a second electrode, a separator, an electrolyte layer, and so forth. By way of example, an electrode can be adjacent another layer in a battery, e.g., a lithium ion battery, or in an electric double layer capacitor (EDLC).

Methods of forming the electrodes are also disclosed. For instance, a method can include mixing a binder coating composition with an electrode particulate material to form a mixture. The binder coating composition can include a functionalized rubber polymer. In addition, the binder coating composition can include a crosslinking agent capable of forming covalent bonds upon subjection to actinic or EB radiation. The binder coating composition can have a melt viscosity of less than about 20 Pascal seconds, so as to be capable of forming a coating layer.

The method can also include applying the mixture to a surface of a current collector to form a layer, and subjecting the layer of the mixture to actinic or electron beam radiation, thereby crosslinking the functionalized rubber polymer.

The binder coating composition can include additional materials such as a reactive diluent, a wetting agent, a photoinitiator, and so forth. In one embodiment, the crosslinking agent can also function as a diluent.

DETAILED DESCRIPTION

Figure 1:
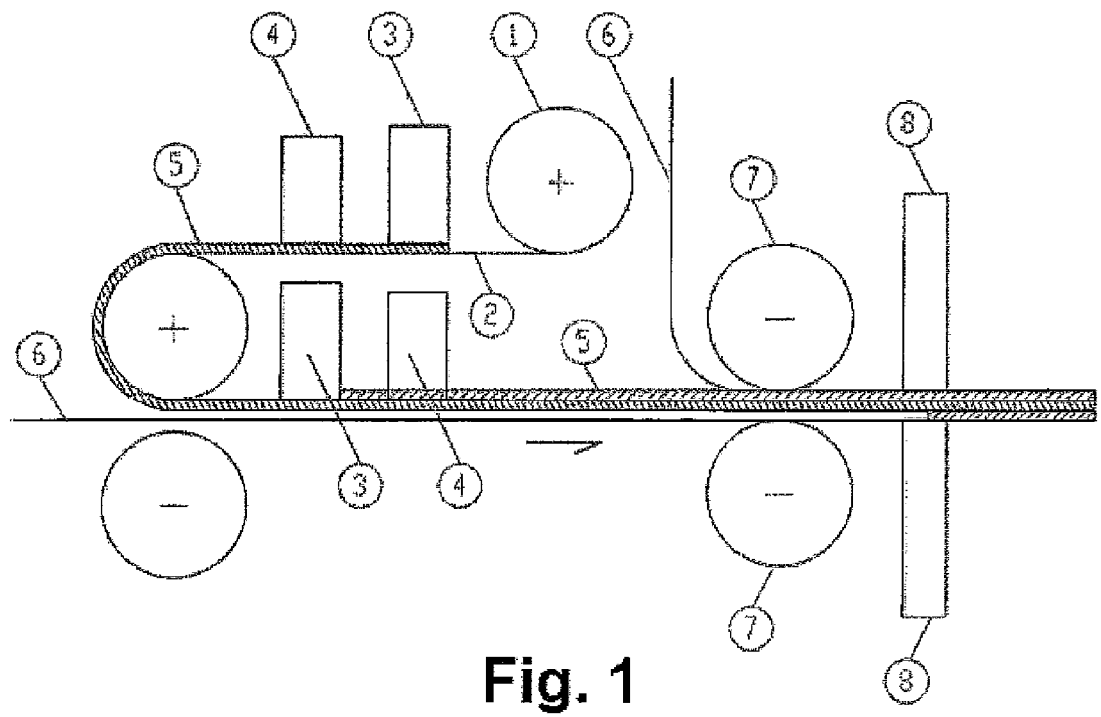
FIG. 1 is a plan view of one embodiment of an electrode manufacturing process as disclosed herein.

Reference now will be made in detail to various embodiments of the disclosed subject matter, one or more examples of which are set forth below. Each example is provided by way of explanation, not limitation, of the subject matter. In fact, it will be apparent to those skilled in the art that various modifications and variations may be made in the present disclosure without departing from the scope or spirit of the disclosure. For instance, features illustrated or described as part of one embodiment, may be used on another embodiment to yield a still further embodiment. Thus, it is intended that the present disclosure cover such modifications and variations.

In general, the present disclosure is directed to a process for manufacturing electrodes without the need for the costly oven-drying or solvent handling described above and to products such as lithium ion batteries, EDLCs and other products as may incorporate the electrodes. More specifically, disclosed electrodes incorporate a polymeric binding material that can be cured with actinic radiation or electron beam (EB) radiation. As utilized herein, the term actinic radiation is intended to refer to electromagnetic radiation that is capable of producing photochemical effects. For instance, disclosed polymeric binding materials can be cured by actinic radiation in the ultraviolet (UV) or visible spectrum, both of which can encompass actinic radiation. A process is also disclosed for mixing actinic radiation or EB curable chemical precursors with solid particles and applying the mixture to an electrode current collector, followed by the subjection of the coated current collector to suitable radiation to so as to covalently crosslink and cure the polymer, thereby binding the particles to one another as well as to the crosslinked polymeric matrix and also binding the electrode material to the current collector.

To date, conventional UV and EB curable binder resins have not been utilized successfully in electrode manufacturing. Generally, this is understood to be due to the extreme conditions present in operating conditions for the electrodes, e.g., the heat and corrosive nature of a lithium ion battery. The majority of conventional binder resins have poor adhesion to metals and/or poor chemical resistance to, for instance, electrolyte material.

Disclosed herein are functionalized polymers that are EB and/or actinic radiation curable and may be utilized as binders in electrode manufacturing. Disclosed polymeric materials demonstrate good adhesion to current collectors (e.g. copper or aluminum) while providing the necessary resistance to harsh operating conditions and electrolytic material present in both batteries and EDLCs.

According to one embodiment, functionalized polymers can be based on rubber polymers. Exemplary rubbers suitable for use include functionalized polyisoprene and/or polybutadiene rubbers. U.S. Pat. No. 4,218,349, incorporated herein by reference, describes polyisoprene-based rubber compositions and the manufacture thereof that may be suitable for use in the present invention. U.S. Pat. No. 5,300,569, incorporated herein by reference, describes polybutadiene-based rubber compositions and the manufacture thereof that may be suitable for use in the present invention. However, disclosed binders are not limited to rubbers incorporating only isoprene and/or butadiene polymers. Functionalized rubber oligomers and polymers as may be utilized in forming the binders can include at least one of isoprene, butadiene, cyclopentadiene, ethylidene norbornene, and vinyl norbornene monomer units, or combinations thereof.

The rubber polymers or oligomers can be functionalized to include reactive groups that improve metal adhesion and/or improve curability by EB or actinic radiation crosslinking. For instance, carboxylated, acrylated, vinyl, vinyl ether, or epoxy functionalized polyisoprene and/or polybutadiene rubbers that are curable with electron beam or actinic ultraviolet radiation can be used. Exemplary functionalized polymers are commercially available, for instance, as Isolene® resins from Elementis, Hightstown, N.J.; Trilene® resins from Chemtura, Middlebury, Conn.; liquid isoprene rubbers (LIR) from Kuraray Co. Pasadena, Tex., and liquid butadiene rubbers (LBD) such as Kraysol®, Ricon®, Riacryl®, and Polybd® resins from Sartomer Co., Exton, Pa. or BAC resins from San Esters, New York, N.Y.

In one embodiment, a binder can have an isoprene backbone with one or more reactive functional groups pendent thereto. These binders have been found to yield exemplary results as a polymeric binder in forming electrodes, for instance cathodes and anodes useful in lithium ion batteries. One embodiment of suitable binders incorporate a carboxylated methacrylated isoprene backbone having the general formula:

wherein n is between about 5 and about 2000, or between about 10 and about 1500, or between about 100 and about 1000.

Of course, binders can include multiple different backbone segments. For instance isoprene-butadiene copolymers are encompassed herein. Binders can generally have a molecular weight from about 7,000 to about 110,000, or from about 10,000 to about 100,000, or from about 10,000 to about 50,000, or from about 15,000 to about 40,000.

The rubber binder polymers can be included in a binder coating composition in an amount from about 20 wt. % to about 100 wt. %, from about 25 wt. % to about 75 wt. %, from about 30 wt. % to about 70 wt. %, or from about 40 wt. % to about 60 wt. % of the binder coating composition.

Suitable functionalized isoprene-based and butadiene-based rubbers can include, without limitation, grades UC-102, UC-105, and UC-203, available from Kuraray Ca, Pasadena, Tex.; and oligomers sold under the designation CN301, CN303, and CN307 available from Sartomer Co., Exton, Pa.

Actinic radiation/EB curable polymer binders as disclosed herein can have a melt viscosity (at 38° C.) of less than about 2000 Pa·s, for instance from about 5 to about 500 Pa·s, or from

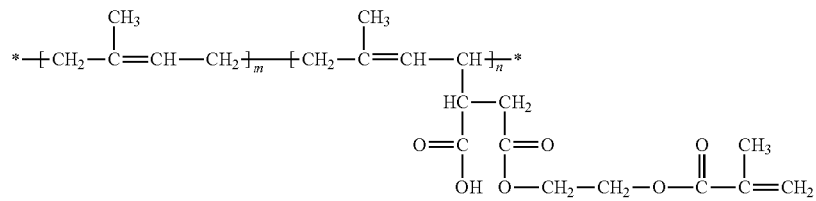

wherein m is between about 10 and about 1000, or between about 100 and about 1000, or between about 200 and about 500; and n is between 1 and about 20, or between 1 and about 10, or between about 2 and about 10, or between about 2 and about 5.

Another embodiment of suitable binders incorporate a carboxylated methacrylated butadiene backbone having the general formula:

about 20 to about 200 Pa·s. In forming an electrode from disclosed binders, a reactive diluent may be added in order to lower the viscosity for ease of coating. Depending upon the characteristics of the polymer, a reactive diluent may be added to lower the viscosity of the binder coating composition to less than about 10 Pa·s, for instance less than about 5 Pa·s, less than about 1.5 Pa·s, or less than about 1 Pa·s. As utilized herein, the term binder coating composition is

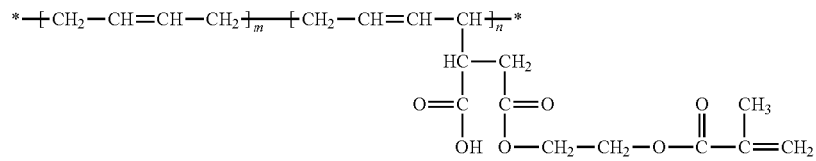

wherein m is between about 10 and about 1000, or between about 100 and about 1000, or between about 200 and about 500; and n is between 1 and about 20, or between 1 and about 10, or between about 2 and about 10, or between about 2 and about 5.

Another embodiment of suitable binders incorporate a butadiene backbone having the general formula:

intended to refer to a composition for application to a current collector prior to cure that does not include any particulate material to be applied to the current collector in conjunction with the binder coating composition. For instance, the term binder coating composition refers to the composition prior to any premixing with lithium metal oxide particulates or graphite particulates and prior to cure.

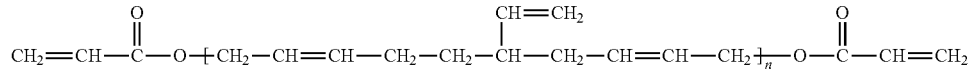

While it will be appreciated that polymers having a melt viscosity higher than about 2000 Pa·s may be utilized, a large amount of diluent would be needed to reduce the binder coating composition to a suitable coating viscosity. If the amount of diluent is greatly in excess of the amount of polymer, processing difficulties may be encountered and the desired properties of the crosslinked polymeric binder may be more difficult to attain. In general a reactive diluent may be present in amounts up to about 90 wt. %, for instance from about 10 wt. % to about 90 wt. %, from about 25 wt. % to about 75 wt. %, or from about 40 wt. % to about 60 wt. % of the binder coating composition. A diluent can be selected so as to not degrade the quality of adhesion to the current collector or the chemical resistance properties of the binder. In addition, a diluent can have properties such that it is compatible with and will not substantially separate from the polymeric binder, for instance during mixing and application of the binder coating composition.

A reactive diluent can react with the functionalized rubber polymer to crosslink the matrix during the cure. Accordingly, reactive diluents may alternatively be referred to as crosslinking agents throughout this disclosure. Examples of reactive diluents encompassed herein include, but are not limited to isobornyl acrylate, polyethylene glycol diacrylate, hexanediol diacrylate, alkyoxylatedhexanedioldiacrylate, and any other compound such as an acrylate that can both react with the functionalized rubber reactants during the cure and lower the melt viscosity of the binder coating composition.

A binder coating composition can include one or more crosslinking agents that do not necessarily also function as a diluent. For example, a polymer having a suitably low melt viscosity can be crosslinked by use of a crosslinking agent that does not also function as a diluent. Moreover, a polymeric binder coating composition can include combinations of crosslinking agents, for example, both a reactive diluent crosslinking agent and a crosslinking agent that does not also act as diluent; two or more different reactive diluent crosslinking agents, two or more crosslinking agents that do not also function as a diluent, and so forth.

Exemplary reactive crosslinking agents of a binder coating composition can include those that can react when subjected to EB and/or actinic radiation. Specific radiation suitable for each crosslinker is generally known in the art. For instance, a crosslinker can react upon subjection with actinic radiation in the UV spectrum or in the visible spectrum. Examples of crosslinking agents can include, without limitation, monofunctional acrylates, difunctional acrylates, and multifunctional acrylates and other vinyl compounds. Suitable acrylates may be linear, branched, cyclic, or aromatic. Linear acrylates can include alkyl acrylates wherein the alkyl contains from 4 to 20 carbon atoms. Branched acrylates can include branched alkyl acrylates wherein the alkyl contains from 4 to 20 carbon atoms such as 2-ethylhexyl acrylate or isostearyl acrylate. Cyclic acrylates can include dicyclopentanyl acrylate and n-vinyl caprolactam. Aromatic acrylates can include phenoxyethylacrylate. Difunctional and multifunctional acrylates can include 1,6-hexandiodi(meth)acrylate, 1,9-hexandiodi(meth)acrylate, and tricyclodecanedimethanol diacrylate.

The polymeric binder can be crosslinked in conjunction with a photoinitiator. For instance, a photoinitiator can be a component of a diluent composition. A photoinitiator may be present in a binder coating composition at concentrations up to about 20 wt. %, for instance from about 1 wt. % to about 15 wt. %, from about 1 wt. % to about 10 wt. %, or from about 1 wt. % to about 7 wt. % of the binder coating composition.

Exemplary photoinitiators can include benzophenone, hydroxyacetophenone, methylbenzophenone, 4-Phenylbenzophenone, 4,4'-Bis(diethylamino)benzophenone, Michler's Ketone, 4-(2-hydroxyethoxy)phenyl-(2-hydroxy-2-methylpropyl)ketone, and other benzophenone derivatives, benzyldimethyl ketal, 2-benzyl-2-N,N-dimethylamino-1-(4-morpholinophenyl)-1 butanone; 2-mercaptobenzoxazole, camphorquinone, 2-hydroxy-2-methyl-1-(4-t-butyl)phenyl-propan-1-none, 2-methyl-1-[4-(methylthiophenyl)-2-morholinopropanone, maleimides, 2,4,5-trimethylbenzolydiphenyl phosphine oxides, bis(2,6-dimethyloxybenzoyl) 2,4,4-trimethylpentyl)phosphine oxide, bis(2,4,6-trimethylbenzoyl)-phenylphosphineoxide, polymeric photoinitiators derived from the above, and combinations thereof. In one embodiment, a propanone photoinitiator may be utilized such as a blend of about 70 wt. % oligo(2-hydroxy-2-methyl-1-[4-(1-methylvinyl)phenyl]propanone and about 30 wt. % 2-hydroxy-2-methyl-1-phenylpropan-1-one, commercially available from Lamberti USA, Inc., Conshohocken, Pa. under the trade name Esacure® KIP 150 or KIP 100F. Other photoinitiators sold by Lamberti USA, Inc. under the KIP or Esacure® designation may also be utilized, such as Esacure SM 303. Other polymeric photoinitiators include PL-816A from Palermo Lundahl Industries. In another embodiment, an oxide photoinitiator may be utilized. One suitable oxide photoinitiator is bis(2,4,6-trimethylbenzoyl)-phenylphosphineoxide commercially available from Ciba Specialty Chemicals, Tarrytown, N.Y. under the trade name Irgacure® 819. Other photoinitiators sold by Ciba Specialty Chemicals under the Irgacure® trade name are also suitable for use.

The binder coating composition may optionally include other processing agents suitable for the desired properties of the coating. Processing agents may be utilized in the coating composition up to about 10 wt. %, in some embodiments up to about 5 wt. %, and in some embodiments up to about 2 wt. % of the binder coating composition. Processing agents that may be suitable for use in a binder coating composition can include, without limitation, coupling agents and adhesion promoters. A suitable coupling agent is γ-glycidoxypropyltrimethoxysilane such as Silquest® A-187, commercially available from Momentive Performance Materials, Albany, N.Y.

In one embodiment, a wetting agent can be included in the binder coating composition. A wetting agent can improve the contact and wetting between the binder coating composition, the particles mixed with the binder coating composition, and the current collector substrate. Accordingly, inclusion of a wetting agent can improve the adherence between the various components following cure of the binder.

Wetting agents can include both sacrificial materials, which will generally be volatized prior to or during the cure of the binder coating composition, as well as materials that can remain in the product following cure. For instance, a wetting agent can also function as an electrolyte following cure of the binder. Exemplary wetting agents can include, without limitation, acetone, isopropyl alcohol, dimethyl carbonate, and the like. In general, any solvent or electrolyte material that can improve wetting and contact between the binder coating composition, the particles, and the current collector can be utilized. In one embodiment, fast evaporating, low boiling temperature wetting agents can be preferred. By way of example, a wetting agent can have a boiling point of less than about 160° F. (about 71° C.). Beneficially, by utilization of a low boiling point wetting agent, the wetting agent can be dissipated during the UV/EB cure, and the substantial thermal energy input necessary for solvent removal of previously known processes is not necessary. Alternatively, wetting agents can be utilized that are designed to remain in the material following the cure, for instance for use as an electrolyte.

Figure 2:
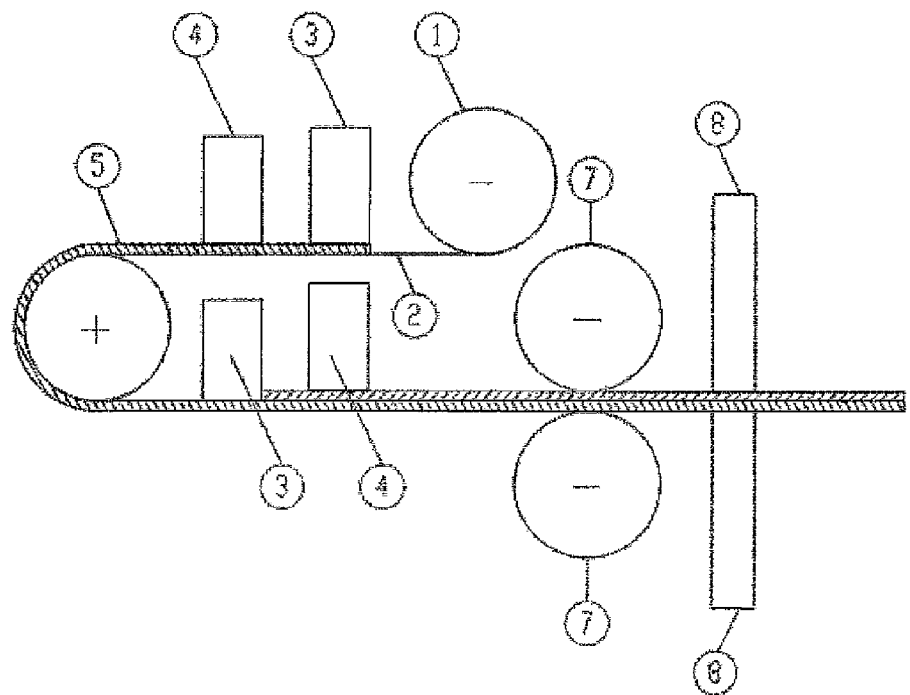
FIG. 2 is a plan view of another embodiment of an electrode manufacturing process as disclosed herein.
Figure 3:
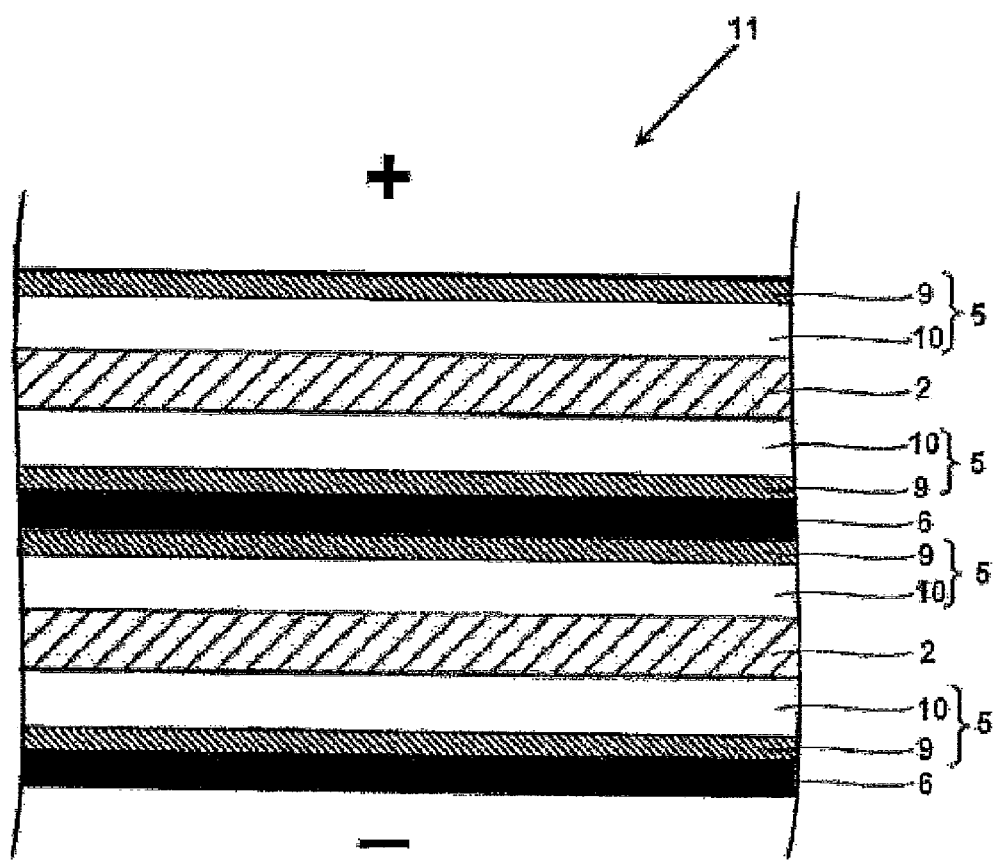
FIG. 3 is a cross-sectional view of a lithium ion electrochemical cell according to one embodiment of the disclosure.

Referring now to the figures, FIGS. 1, 2, and 3 illustrate embodiments for applying an electrode particulate material 10 (FIG. 3) and a polymeric binder coating composition 9 (FIG. 3) as an electrode layer 5 to an electrode current collector 2. Though shown as separate layers in FIG. 3, the electrode particulate material 10 and the binder coating composition are generally applied to a current collector 2 mixed as a single electrode layer 5. The polymer of the electrode layer 5 is then cured on the current collector 2 utilizing actinic and/or EB radiation. Following crosslinking to form a matrix adhered to a current collector, the binders can exhibit excellent chemical resistance and can be insoluble in electrolytes at elevated temperatures while demonstrating exceptional adhesion to current collectors.

Particulate materials 10 as may be incorporated in electrodes can include any particulate materials as are generally known in the art such as, without limitation, carbon particulate materials such as graphene, activated carbon, graphite, low sulfur graphite, carbon nanotubes, silicon-based materials, etc.; metal oxide salts such as oxides of lithium, cobalt, manganese, nickel, or vanadium; and so forth. By way of example, particulate materials can include lithium compounds such as lithium manganese oxide, lithium cobalt oxide, lithium nickel oxide, lithium nickel cobalt aluminum oxide, lithium iron phosphate, lithium nickel manganese cobalt (NMC), and mixtures thereof.

In further detail, referring to FIGS. 1, 2, and 3, an electrode current collector feed roll 1 supplies electrode current collector 2. An applicator 3 mixes the electrode particulate material 10 with the polymeric binder coating composition 9 and applies a thin layer 5 of the mixed components to moving current collector 2. Of course, the electrode particulate material 10 and various components of a binder coating composition 9 may be premixed prior to addition to the applicator 3 if desired. For instance, a carbon particulate material and a solid binder polymer can first be milled, e.g., in a 3 roll mill. Following the mixing of the carbon and the binder polymer, lithium compounds and a suitable diluent (as well as any additional components such as additional crosslinkers or photoinitiators) can be added to the solid, milled mixture, decreasing the melt viscosity of the mixture and forming the mixture to a spreadable paste of a suitable viscosity.

Applicator 3 applies the mixture as electrode layer 5 to the current collector 2. This application coating may be accomplished by conventional coating techniques such as, gravure, flexo, slot die, reverse roll, knife over roll, offset, or the like.

Following formation of the electrode layer 5, the layer can be subjected to actinic and/or EB radiation, which can crosslink the functionalized rubber polymers of the electrode layer. For instance, upon subjection of the binder coating composition to UV, visible and/or EB radiation and, when necessary, in the presence of a photoinitiator, the crosslinking agents of the composition can react with the reactive functional groups of the rubber polymers, forming covalent bonds throughout the layer and thereby firmly encapsulating the particulate material within the crosslinked network and also firmly binding the electrode material layer 5 to the current collector 2.

The resulting application of the electrode layer 5 to electrode current collector 2 and the crosslinking thereof with a relatively short residence time for actinic radiation curing 4 and/or EB curing 8 can increase production speeds and reduce costs. Multiple applicator stations 3 may be employed to build up several layers of electrode coating materials, optionally with separator layers therebetween, so that the resulting final thickness required can be accomplished at high speeds of for example from about 20 FPM to about 400 FPM.

Separators that can be included between layers of electrodes can be any separator as is generally known in the art. For instance, when forming an EDLC or a lithium ion battery, a separator can be applied between adjacent electrode layers that is formed of a polymeric sheet, such as polytetrafluoroethylene (PTFE), polypropylene (PP), polyethylene (PE), or fused layers of PP & PE, and the like.

The binder coating composition 9 can generally be present in electrode layer 5 from about 1 wt. % to about 20 wt. %, for instance from about 2 wt. % to about 12 wt. %, from about 2 wt. % to about 6 wt. %, or from about 3 wt. % to about 5 wt. %. The coating mixture is generally applied in a very thin layer 5 to electrode current collector 2. Electrode layer 5 thickness may be from about 1 to about 500 microns, from about 5 to about 250 microns, from about 5 to about 200 microns, or from about 5 to about 150 microns. An electrode layer 5 may be applied to one or both sides of the current collector 2. FIGS. 1 and 2 illustrate a system applying electrode layer 5 to each side of a current collector 2.

FIGS. 1 and 2 depict systems utilizing both actinic and EB radiation devices 4 and 8, respectively. Depending on the characteristics of the binder coating composition, either actinic radiation device 4, EB radiation device 8, or both may be utilized.

Referring to FIG. 1, an electrolyte 6 may be integrated with electrode current collector 2 and electrode layer 5. Electrolyte 6 can be a solid, a liquid, or a gel, as is known in the art. For example, electrolyte 6 can be an organic electrolyte, such as a carbonate (e.g., ethylene carbonate or diethyl carbonate containing complexes of lithium ions), or an aqueous electrolyte, such as potassium hydroxide, sulfuric acid, or a liquid mixture of organic carbonates such as alkyl carbonate containing complexes of lithium ions (e.g., non-coordinated anion salts such as $LiPF_6$, $LiAsF_6$, $LiClO_4$, $LiBF_4$, and $LiCF_3SO_3$). If electrolyte 6 is liquid, a polymeric separator may be included in electrolyte layer 6. Generally, if electrolyte 6 is a solid or gel, an electrolyte separator is not needed, though a separator may still be utilized in these embodiments. If an electrode layer 5 is applied to both sides of the current collector 2, electrolyte 6 may be integrated on each side of current collector 2. The product may then be passed through calendar rolls 7 which can compress the layers to a desired thickness. If required, electron beam radiation device 8 may radiate through the electrolyte 6 to cure the binding material.

Referring to FIG. 2, illustrated is a process for manufacturing an electrode that does not incorporate electrolyte 6. The technique depicted in FIG. 2 could be combined with the technique depicted in FIG. 1 to assemble an electrochemical cell 11 such as shown in FIG. 3. For example, the process depicted in FIG. 1 may be utilized to construct the anode or cathode (current collector 2 and electrode layer 5) and electrolyte 6. The process depicted in FIG. 2 may be utilized to construct the opposing electrode without electrolyte 6. The products of FIGS. 1 and 2 may then be combined to construct an electrochemical cell.

For instance, FIG. 3 generally illustrates a lithium ion electrochemical cell 11 that may be formed in accordance with the disclosure. As illustrated, the cell 11 includes current collector 2 with an electrode layer 5 disposed on each side. The electrode layer 5 includes anode (−) or cathode (+) active material 10 and actinic and/or EB curable polymeric binder coating 9. FIG. 3 illustrates the electrode material 10 and the binder coating 9 as separate layers for convenience of illustration. Electrolyte 6 and optionally an electrolyte separator (not shown) may be disposed on each electrode layer 5. As one skilled in the art appreciates, a lithium ion battery may comprise any number of electrochemical cells 11 in series or parallel as desired. In addition to cell 11, a lithium ion battery constructed in accordance with the disclosure may further include insulation material, casings, control circuitry, connectors, etc. as will be appreciated by those skilled in the art. Furthermore, the battery can be any type of lithium ion battery such as cylindrical, prismatic, pouch-type, or other batteries as are understood in the art.

Figure 4:
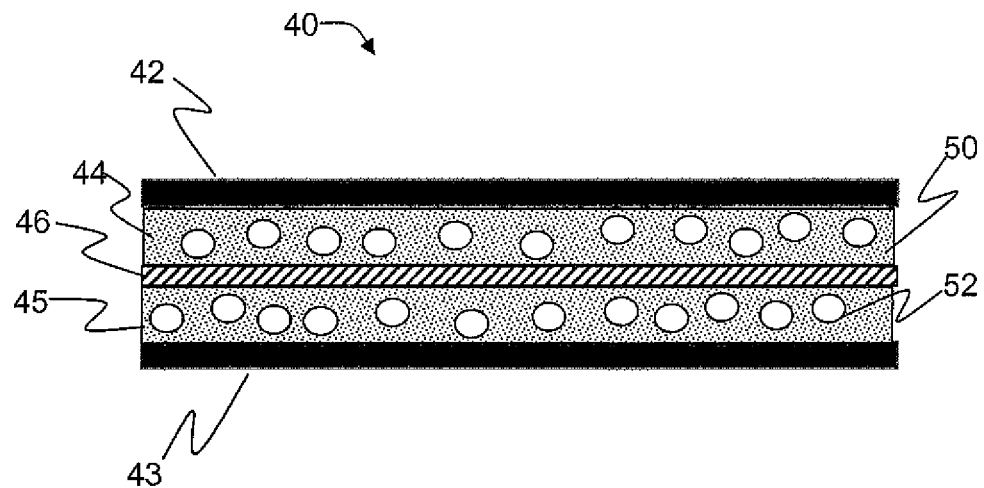
FIG. 4 is a cross-sectional view of an EDLC according to one embodiment of the disclosure.

Similarly, a first electrode and a second identical electrode can be assembled with a suitable electrolyte and separator therebetween to construct an EDLC. For instance, and with reference to FIG. 4, an EDLC 40 can include a first aluminum current collector 42 and a second aluminum current collector 43. The first and second current collectors 42, 43 can be separated by a separator 46. A first layer 44 and a second layer 45 on either side of the separator 46 can be the same or different. For instance, both layer 44 and 45 can include an actinic/EB radiation cured binder 50 and particulates 52, e.g. graphite, in a mixture. The separator 46 can be any standard separator, for instance a porous PTFE film.

The present disclosure can provide numerous advantages. For instance, disclosed methods may significantly reduce manufacturing costs for electrodes, and thereby products produced therefrom. The advantages of the present disclosure can include, without limitation:

a) Substantial reduction of processing time for curing electrode binding materials.

b) Significant reduction in capital and operating costs by eliminating the need for thermal curing ovens and the associated energy inefficiencies of thermal drying in lieu of actinic and/or EB radiation curing stations.

c) Substantial reduction in space, building, and infrastructure and maintenance that accompany thermal curing. For example, existing thermal lines are 100 ft long and run 10-20 ft per minute; two UV lamps can fit in a length of 2 feet (replacing 100 ft of production line) and produce batteries at 200 ft/min. So to expand the thermal line to run at the 200 ft/min, the thermal section of the production line would have to be increased to 1,000-2,000 ft long or building needs to be an additional 0.2-0.4 miles long.

d) Substantial reduction or elimination of the requirement of organic solvents which may substantially reduce or eliminate the costs of Volatile Organic Compound (VOC) procurement, recovery, and disposal.

The present invention may be better understood with reference to the following examples.

EXAMPLES 1-4

The ability to form a coating on an aluminum substrate that is actinic and/or EB radiation cured and remains adhered to the substrate under lithium ion battery simulated conditions was demonstrated. Four samples were tested. The compositions of each sample are shown in Table 1, below. The composition values are reported in percent by weight. For each sample, a binder coating composition was coated onto a 2"×2" sample of aluminum foil. Each sample was then UV cured and weighed. Following curing the sample was placed in a container and immersed in a mixture of 40 wt. % ethylene carbonate and 60 wt. % dimethyl carbonate and placed in an oven. The oven was held at approximately 140° F. for two weeks. For approximately one hour of the test time, the oven temperature reached approximately 180° F. The temperature and atmosphere of the oven served to simulate the temperature and electrolyte composition generally found in operational lithium ion batteries. The results of the tests are also shown in Table 1 below.

TABLE 1

| | Sample | | | |
|---|---|---|---|---|
| | 1 | 2 | 3 | 4 |
| CN 120B80Z[1] | — | — | 95.00 | — |
| Darocure 4265[2] | | | 5.00 | 5.00 |
| UC-102[3] | 47.75 | 47.03 | | |
| SR-259[4] | 47.75 | | | 95.00 |
| SR-506[5] | | 47.03 | | |
| Esacure KIP 100F[6] | 4.00 | 4.00 | | |
| Irgacure 819[7] | 0.50 | 0.50 | | |
| Silquest A-187[8] | | 1.43 | | |
| Total | 100.00 | 100.00 | 100.00 | 100.00 |
| Weight of aluminum foil (g) | 1.2636 | 1.2685 | 1.2706 | 1.2735 |
| Weight of aluminum foil + UV cured coating (g) | 2.7213 | 2.7216 | 3.2764 | 4.4021 |
| Weight of aluminum foil + UV cured coating after 2 week oven exposure in ethylene carbonate (40 wt. %) + dimethyl carbonate (60 wt. %) atmosphere (g) | 2.7245 | 2.7254 | 3.7107 | 4.7127 |
| Adhesion to aluminum after exposure | adhered | adhered | lifting | lifting |
| Structure | solid | solid | swell & lift | swell & cracks |
| Percent weight gain after 2 week soak | 0.2 | 0.3 | 21.7 | 9.9 |

[1]Reactive epoxy acrylate oligomer/monomer mixture available from Sartomer Co., Exton, PA
[2]UV photoinitiator available from Ciba Specialty Chemicals, Tarrytown, NY
[3]Reactive liquid rubber oligomer available from Kuraray Co. Ltd., Pasadena, TX
[4]Polyethylene glycol 200 diacrylate reactive diluent monomer available from Sartomer Co., Exton, PA
[5]Isobornyl acrylate reactive diluent monomer available from Sartomer Co., Exton, PA
[6]UV photoinitiator available from Lamberti USA, Inc., Conshohocken, PA
[7]UV photoinitiator available from Ciba Specialty Chemicals, Tarrytown, NY
[8]γ-glycidoxypropyltrimethoxysilane coupling agent available from Momentive Performance Materials, Albany, NY As can be seen, samples 1 and 2 containing UC-102 produced a coating that solidly adhered to the aluminum substrate with minimal weight gain after two weeks immersed in a carbonate mixture. Conversely, sample 3 utilizing a reactive epoxy acrylate oligomer/monomer mixture (bisphenol epoxy acrylate oligomer diluted with 20 wt. % hexanediol diacrylate), yielded a coating that delaminated from the aluminum substrate while increasing in weight by 21.7%. Likewise, sample 4 composed of 95 wt. % of reactive diluent monomer and 5 wt. % photoinitiator yielded a coating that also substantially delaminated while increasing in weight by 9.9%. Sample 1 and 2 are suitable mixtures for electrode binders. Samples 3 and 4 demonstrate that more common acrylate mixtures are unsuitable for use as electrode binders

EXAMPLE 5

An approximately 200 gram mixture of 90 wt. % $LiMn_2O_4$, 6 wt. % carbon black and 4 wt. % of a mixture of approximately 50 wt. % UC-102 and 50 wt. % isobornyl acrylate reactive diluent was mixed in a laboratory scale Magnetically Assisted Impact Coating device (MAIC) on a batch basis. The test resulted in the MAIC device successfully dispersing the liquid mixture of UC-102 and isobornyl acrylate as a coating on the surface of the solid $LiMn_2O_4$ and carbon particles.

EXAMPLE 6

The $LiMn_2O_4$ and carbon particles coated with the mixture of UC-102 and isobornyl acrylate in Example 5 were dried and applied to an aluminum foil substrate. The material was then EB cured with 50 Mrad exposure. Following EB curing, the aluminum substrate was rotated to observe the adhesion quality of the material to the aluminum. No substantial amount of the material remained adhered to the substrate.

EXAMPLE 7

The $LiMn_2O_4$ and carbon particles coated with the mixture of UC-102 and isobornyl acrylate in Example 5 were mixed with approximately 40 wt. % by volume of acetone and applied as an approximately 10 mil layer on an aluminum foil substrate. The addition of approximately 40% by volume acetone as a wetting agent reduced the viscosity of the mixture sufficiently for the material to be coated on an aluminum foil substrate. The material was then permitted to air dry for a few seconds to allow the acetone to evaporate. After the acetone had sufficiently evaporated, the material was then EB cured with 50 Mrad exposure. Following EB curing, the aluminum substrate was rotated to observe the adhesion quality of the material to the aluminum. The material remained sufficiently adhered to the substrate.

EXAMPLE 8

The $LiMn_2O_4$ and carbon particles coated with the mixture of UC-102 and isobornyl acrylate in Example 5 were mixed with approximately 40% by volume of dimethyl carbonate electrolyte and applied as an approximately 10 mil layer on an aluminum foil substrate. The approximately 40% by volume of the dimethyl carbonate electrolyte as a wetting agent was added to the mixture to improve the contact between the binder and the aluminum. The material was then EB cured with 50 Mrad exposure. The material was not completely dry prior to EB curing. Following EB curing, the aluminum substrate was rotated to observe the adhesion quality of the material to the aluminum. The material remained sufficiently adhered to the substrate. This result demonstrates that a wetting agent electrolyte can improve contact between the binder and the aluminum foil so that when the binder is cured it has better adhesion to the aluminum foil. The electrolyte has no adhesion to the aluminum foil and does not become part of the polymer.

As shown in Examples 6-8, a small amount of wetting agent may be needed in order to improve contact between the binder, particles, and the aluminum foil substrate during actinic or EB radiation polymerization. Example 8 illustrates that an electrolyte material, such as commonly utilized in lithium ion batteries, may be used as a wetting agent to improve wetting between the particles, binder and aluminum foil substrate. It is recognized that the hydrophilic nature of some electrolyte materials will require moisture control in the manufacturing process.

EXAMPLE 9

A mixture of 90 wt. % $LiMn_2O_4$ and 4 wt. % carbon particles coated with 6 wt. % binder coating composition comprised of 47 wt. % UC-102, 47 wt. % isobornyl acrylate and 4 wt. % Esacure KIP 100F and 0.5 wt. % Irgacure 819 photoinitiators and 1.5 wt. % Silquest A-187 coupling agent was prepared using the Magnetically Assisted Impact Coating technique. This cathode coating material was spread to an approximate 26-micron thickness and one inch width using a flat knife to a 26-micron thick aluminum foil substrate that had been cleaned with a 5% acetic acid solution by submersion for 10 seconds. The coated aluminum foil was then passed through a two roller jeweler's press to create greater contact between the aluminum foil, solid particles and binder. The structure was then exposed with 2 passes under actinic UV radiation utilizing a 400 watt/inch D bulb powered by a Miltec MP-400 Power Supply and a Fusion I250 irradiator. This procedure was repeated using about 10% to about 40% compaction ratios of the cathode coating material in the jewelers press. Following the UV curing, the aluminum substrate was rotated to observe the adhesion of the cathode particles to the aluminum and to one another. In all cases the particle adhesion to the aluminum was unsatisfactory, less than 5% adhesion; and the adhesion among particles was also unsatisfactory, less than 10%.

EXAMPLE 10

A mixture of 90 wt. % $LiMn_2O_4$ and 4 wt. % carbon particles mixed into 6 wt. % binder composition comprised of 47 wt. % UC-102, 47 wt. % isobornyl acrylate and 4 wt. % Esacure® KIP 100F and 0.5 wt. % Irgacure® 819 photoinitiators and 1.5 wt. % Silquest® A-187 coupling agent was prepared using the Magnetically Assisted Impact Coating technique. This cathode coating material was mixed by simple stirring in a beaker with approximately 15 wt. % isopropyl alcohol as a wetting agent. The mixture was applied to an aluminum foil at an approximately 26-micron thickness and one inch width using a flat knife substrate. The foil had been cleaned with a 5% acetic acid solution by submersion for 10 seconds. The coated foil was then exposed with 2 passes under actinic ultraviolet radiation utilizing a 400 watt/inch D bulb powered by a Miltec MP-400 Power supply and a Fusion I250 irradiator. The belt speed was adjusted to 20 feet per minute. This procedure was repeated increasing the belt speed to 50 feet per minute, 100 feet per minute, and then 150 feet per minute. Following the UV curing, the aluminum substrate was rotated to observe the adhesion quality. Adhesion was good when cured at 20 fpm, 50 fpm, and 100 fpm. At 150 fpm, adhesion was good in some areas and poor in other areas, indicating that the cure speed of this formula is less than 150 fpm.

EXAMPLE 11

A mixture of 40 wt. % carbon and 60 wt. % binder comprised of 47 wt. % UC-102, 47 wt. % isobornyl acrylate and 4 wt. % Esacure® KIP 100F and 0.5 wt. % Irgacure® 819 photoinitiators and 1.5 wt. % Silquest® A-187 coupling agent was prepared using a standard 700 RPM stirrer. This carbon and binder mix was then mixed with isopropyl alcohol as a wetting agent and incremental amounts of $LiCoO_2$ until the final mix was by weight 7.5 wt. % carbon and binder mix, 25 wt. % isopropyl alcohol, and 67.5 wt. % $LiCoO_2$. The mixture was applied to an approximately 26-micron thickness and one inch width using a flat knife to an aluminum foil substrate that had been cleaned with a 5% acetic acid solution by submersion for 10 seconds. The coated aluminum was exposed to actinic ultraviolet radiation utilizing two (2) 400 watt/inch D bulbs powered by a Miltec MP-400 Power supply and a Fusion I250 irradiator. The belt speed was adjusted to 50 feet per minute. Adhesion of the particles one to another and of the particles to the aluminum was good. The isopropyl alcohol wetting agent was evaporated completely by the brief exposure to the UV lamp chamber. The curing belt speed was set to 100, 150, and then 200 feet per minute. Coating adhesion was tested by folding and inverting the coated aluminum. At all three curing speeds the adhesion was good. This demonstrated the ability to achieve satisfactory adhesion of carbon and a typical active lithium cathode material to a current collector using a UV curable binder mix including a wetting agent to ease deposition and the coating cured at up to 200 feet per minute processing speed which equates to a residence time in the UV lamp exposure of less than a second.

EXAMPLE 12

A mixture of 40 wt. % carbon and 60 wt. % binder comprised of 47 wt. % CN301, 23.5 wt. % isobornyl acrylate, 23.5 wt. % SR-238 HDODA, and 4.5 wt. % SM303 photoinitiator and 1.5 wt. % Genorad 51 dispersing agent was prepared using a standard 700 RPM stirrer. This carbon and binder mix was then mixed with isopropyl alcohol as a wetting agent and incremental amounts of $LiCoO_2$ until the final mix was by weight 7.5% carbon and binder mix, 25% isopropyl alcohol, and 67.5% $LiCoO_2$. The mixture was applied to an approximately 26-micron thickness and one inch width using a flat knife to an aluminum foil substrate that had been cleaned with a 5% acetic acid solution by submersion for 10 seconds. The coated aluminum was exposed to actinic ultraviolet radiation utilizing two (2) 400 watt/inch D bulbs powered by a Miltec MP-400 Power supply and a Fusion I250 irradiator. The belt speed was adjusted to 50 feet per minute. Adhesion of the particles one to another and of the particles to the aluminum was good. The belt speed was adjusted to 100, 150, and 200 feet per minute and adhesion tested by folding and inverting the coated aluminum. In all cases, adhesion was good.

EXAMPLE 13

A mixture of 40 wt. % carbon and 60 wt % binder comprised of 47 wt. % CN301, 47 wt. % isobornyl acrylate and 4 wt. % Esacure® KIP 100F and 0.5 wt. % Irgacure® 819 photoinitiators and 1.5 wt. % Silquest® A-187 coupling agent was prepared using a standard 700 RPM stirrer. This carbon and binder mix was then mixed with isopropyl alcohol as a wetting agent and incremental amounts of $LiCoO_2$ until the final mix was by weight 7.5% carbon and binder mix, 25% isopropyl alcohol, and 67.5% $LiCo_2O_4$. The mixture was applied to an approximately 26-micron thickness and one inch width using a flat knife to an aluminum foil substrate that had been cleaned with a 5% acetic acid solution by submersion for 10 seconds. The coated aluminum was exposed to actinic ultraviolet radiation utilizing two (2) 400 watt/inch D bulbs powered by a Miltec MP-400 Power supply and a Fusion I250 irradiator. The belt speed was adjusted to 200 feet per minute and adhesion tested by folding and inverting the coated aluminum. Adhesion was good. The coated aluminum coupon was then immersed in a mixture of 60%/40% dimethyl/ethylene carbonate and held at 140° F. for 2 weeks. At the end of the two week testing period weight gain was essentially zero and adhesion to the aluminum and to the particles was good. This demonstrates a cathode coating was applied using UV curable binder blend and cured at a processing speed of 200 feet per minute and exposure time to UV radiation of less than one second retained adhesion and physical integrity after exposure to a Lithium-ion battery electrolyte environment for 2 weeks.

EXAMPLE 14

A mixture of 40 wt. % carbon and 60 wt. % binder comprised of 47 wt. % CN301, 23.5 wt. % isobornyl acrylate, 23.5 wt. % CD563 AHDODA, and 4.5 wt. % SM303 photoinitiator and 1.5 wt. % Genorad 51 dispersing agent was prepared using a standard 700 rpm stirrer. This carbon and binder mix was then mixed with isopropyl alcohol as a wetting agent and incremental amounts of $LiCoO_2$ until the final mix was by weight 7.5% carbon and binder mix, 25% isopropyl alcohol, and 67.5% $LiCoO_2$. The mixture was applied to an approximate 26-micron thickness and one-inch width using a flat knife to an aluminum foil substrate that had been cleaned with a 5% acetic acid solution by submersion for 10 seconds. The coated aluminum was exposed to actinic radiation utilizing two (2) 400 watt/inch D bulbs powered by a Miltec MP-400 Power supply and a Fusion I250 irradiator. The belt speed was adjusted to 200 feet per minute and adhesion tested by folding and inverting the coated aluminum. Adhesion was good. The coated aluminum coupon was then immersed in a mixture of 60%/40% dimethyl/ethylene carbonate and held at 140° F. for 2 weeks. At the end of the two week testing period weight gain was essentially zero and adhesion to the aluminum and the particles one to another was good.

EXAMPLES 15-17

The ability to utilize UV curable binders in the formulation of a lithium-ion battery cathode that can be satisfactorily charged and discharged through multiple cycles with performance typical of a lithium-ion battery cathode using typical active electrode compounds such as $LiCoO_2$ and $LiMn_2O_4$ was demonstrated. Three samples were tested. The cathode current collector coating compositions are shown in Table 2 below. Each sample consisted of an approximate 2 inch by 6 inch piece of 26-micron thick aluminum sheet initially coated with a combination of binder blend, carbon, lithium compound, and isopropyl alcohol as a wetting agent. The binder blend and the carbon were first mixed in a D-10 mixer available from H. Duke Enterprises of Pleasant View, Tenn. Further mixing to ensure a homogeneous blend was accomplished using an EXAKT Model 80S Three Roll Mill available from EXAKT Technologies, Oklahoma City, Okla. The binder mix, carbon, lithium compound, and isopropyl alcohol as a wetting agent were mixed in the proportions shown under the heading "Coating" in Table 2 below. The same D-10 mixer of above was used for mixing the components. The coating mix was applied to the aluminum sheet current collector using a micrometer adjusted knife edge applicator set to a thickness of 75 microns. The coated current collector samples were cured at various speeds as depicted in Table 2 under 2, 600 Watt/inch, 10" long, D type UV lamps. As a result of the UV curing process only the carbon, binder cathodes were assembled into 2032 coin half cells using lithium metal as the anode, Celgard 2325 as the separator (a PP/PE/PP trilayer film from Celgard, LCC in Charlotte, N.C.), and 1.2 molar LiPF6 in ethylene carbonate:ethylmethylcarbonate (3:7 by weight) as the electrolyte. The half cells were assembled in a Helium inserted glove box and subjected to electrochemical charge/discharge testing utilizing a Maccor 4400 electrochemical test apparatus.

TABLE 2

| Binder and Carbon Mix | Example 15 Weight % | Example 16 Weight % | Example 17 Weight % | Example 18-19 Weight % |
|---|---|---|---|---|
| C107[1] | 6.00% | 6.00% | 0.00% | 0.00% |
| ITX[2] | 2.00% | 2.00% | 0.00% | 1.00% |
| Irgacure 819[3] | 0.20% | 0.20% | 2.00% | 0.00% |
| Chivacure 184[8] | 0% | 0% | 5.00% | 5.00% |
| Chivacure 169[13] | 0% | 0% | 0.00% | 4.00% |
| CD564[9] | 0% | 0% | 24.00% | 20.00% |
| SR506[4] | 22.80% | 22.80% | 24.00% | 25.00% |
| SR238[5] | 23.00% | 23.00% | 0.00% | 5.00% |
| CN301[6] | 20.00% | 20.00% | 0.00% | 0.00% |
| CN307[10] | 0% | 0% | 20.00% | 25.00% |
| Gen 51[7] | 6.00% | 6.00% | 0.00% | 0.00% |
| NMP[15] | 0.00% | 0.00% | 0.00% | 15.00% |
| Carbon Super P[10] | 20.00% | 20.00% | 25.00% | 0.00% |
| Total | 100.00% | 100.00% | 100.00% | 100.00% |
| Coating | | | | |
| Binder Mix | 16% | 16% | 2.8% | 24.00% |
| Carbon P | 4% | 4% | 8.4% | 0.00% |
| $LiMn_2O_4$[11] | 30% | 30% | 58.8% | 0.00% |
| $LiCoO_2$[12] | 30% | 30% | 0.0% | 0.00% |
| Graphite ESLP10[14] | 0% | 0% | 0.0% | 36.00% |
| Isopropyl Alcohol | 20% | 20% | 30.0% | 40.00% |
| | 100% | 100% | 100.0% | 100.0% |
| Coating thickness | 75 microns | 75 microns | 75 microns | 75 microns |
| Curing Speed | 150 feet per minute | 200 feet per minute | 100 feet per minute | 200 feet per minute |
| Calendered Thickness Cured Coating | 50 microns | 50 microns | 50 microns | 50 microns |
| $LiMn_2O_4$ | 37.5% | 37.5% | 84% | 0.00% |
| $LiCoO_2$ | 37.5% | 37.5% | 0% | 0.00% |
| Binder Mix | 20% | 20% | 12% | 40.00% |
| Graphite | 0% | 0% | 0% | 60.00% |
| Carbon P | 5% | 5% | 4% | 0.00% |

[1]Photoiniator available from Chitec Technology, Corp. Taipei, Taiwan
[2]Photosensitizer available from Chitec Technology Corp. Taipei, Taiwan
[3]UV photoinitiator available from Ciba Specialty Chemicals, Tarrytown, NY
[4]Isobornyl acrylate reactive diluent monomer available from Sartomer Co., Exton, PA
[5]Hexanedioldiacrylate reactive diluent monomer available from Sartomer Co., Exton, PA
[6]Polybutadienedimethylacrylate oligomer available from Sartomer Co., Exton, PA
[7]Dispersant available from Rahn USA Corp, Aurora, IL
[8]Photoiniator available from Chitec Technology, Corp., Taipei, Taiwan
[9]Alkoxylatedhexanedioldiacrylate reactive diluent monomer available from Sartomer Co., Exton, PA
[10]Carbon powder available from Sigma-Aldrich, Co, St. Louis, MO
[11]Lithium Cobalt Oxide available from Sigma-Aldrich, Co, St Louis MO
[12]Lithium Manganese Oxide available from Sigma-Aldrich, Co, St Louis, MO
[13]Photoinitiator available from Chitec Technology, Corp,, Taipei, Taiwan
[14]Graphite available from Timcal Graphite and Carbon, Westlake, Ohio
[15]N-Methyl-2-Pyrrolidone available from Worldchem, LTD, Hafei, Anhui, China blend and lithium compounds remained on the current collector in the proportions shown under the heading "Cured Coating" in Table 2 below. All three samples emerged from the UV curing lamps with very good adhesion of the carbon and lithium compound particles to the current collector and to one another. All three samples were calendered in a roll press from 75-microns thickness to 50-micron thickness. The samples were shipped to the US Department of Energy Argonne National Laboratory for electrochemical testing.

Figure 5:
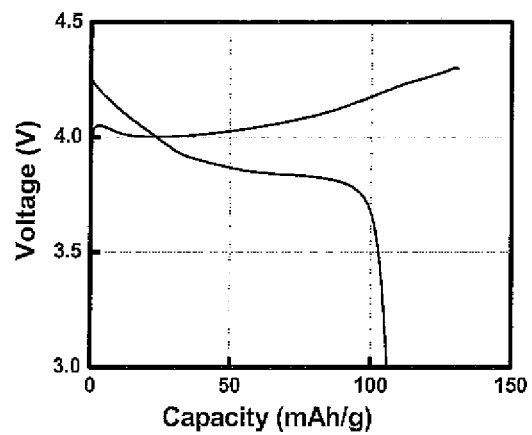
FIG. 5 is an initial charge and discharge curve of an electrochemical cell formed as disclosed herein.
Figure 6:
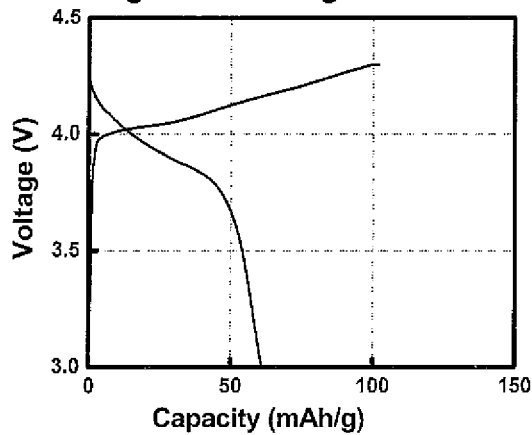
FIG. 6 is an initial charge and discharge curve of another electrochemical cell formed as disclosed herein.
Figure 7:
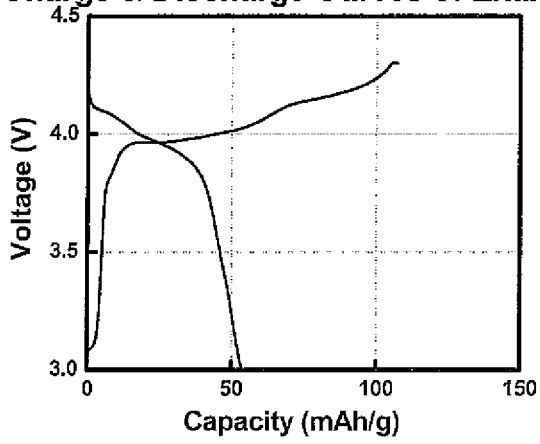
FIG. 7 is an initial charge and discharge curve of another electrochemical cell formed as disclosed herein.

At the test laboratory, a circular coupon the diameter of a 2032 Coin Cell was cut from each sample. The UV cured The electrochemical test results of the initial charge and discharge of examples 15, 16, and 17 are shown in FIGS. 5, 6, and 7, respectively. Sample 1 corresponds to Example 15 (FIG. 5); Sample 2 corresponds to Example 16 (FIG. 6); and Sample 3 corresponds to Example 17 (FIG. 7). Sample 1 (Example 15) was subsequently subjected to cyclic charge and discharge. Sample 1 was charged and discharged at the C/5 rate of 24 milliamperes/gram and it retained 61% of the initial charge capacity after ten cycles.

The composition of Example 15 included $LiCoO_2$/$LiMn_2O_4$ of approximately 7.4 mg/cm$^2$ of active material.

The current density was C/5, 24 mA/g, and the cut-off voltage was 3.0-4.3 V. The charge capacity was 130 mAh/g and the discharge capacity was 105 mAh/g.

The composition of Example 16 included $LiCoO_2$/$LiMn_2O_4$ of approximately 5.2 mg/cm$^2$ of active material. The current density was C/5, 24 mA/g, and the cut-off voltage was 3.0-4.3 V. The charge capacity was 101 mAh/g and the discharge capacity was 61 mAh/g.

The composition of Example 17 included $LiMn_2O_4$ of approximately 5.2 mg/cm$^2$ of active material. The current density was C/5, 24 mA/g, and the cut-off voltage was 3.0-4.3 V. The charge capacity was 107 mAh/g and the discharge capacity was 54 mAh/g.

EXAMPLE 18

The ability to utilize UV curable binders in the formulation of a lithium-ion battery anode coating on a current collector that can retain integrity and adhesion in the presence of a typical Lithium ion battery electrolyte was demonstrated. A UV curable binder mix was prepared using conventional mixing techniques in the proportions shown in Table 2, Examples 18-19 under the heading, "Binder and Carbon Mix". Graphite was added to the UV curable binder mix to comprise an anode coating mixture using conventional mixing techniques in the proportions shown in Table 2, Examples 18-19 under the heading, "Coating". The coating mix was applied to a 26 micron thick copper foil current collector using a micrometer adjusted knife edge applicator set to a thickness of 75 microns and exposed to actinic radiation utilizing two (2) 400 watt/inch D bulbs powered by a Miltec MP-400 Power supply and a Fusion I250 irradiator at a speed of 200 feet per minute. During exposure to the UV radiation, the isopropyl alcohol evaporated. The cured coating was calendered to 50 micron thickness. Following curing and calendering, a two inch by two inch coupon of the coated current collector was then immersed in a mixture of 60%/40% dimethyl/ethylene carbonate and held at 140° F. for one week. At the end of the one week testing period weight gain was essentially zero and adhesion to the copper and the particles one to another was good.

EXAMPLE 19

The ability to utilize UV curable binders in the formulation of an Electric Double Layer Capacitor (EDLC) electrode coating on a current collector that can retain integrity and adhesion in the presence of a typical EDLC electrolyte was demonstrated. A UV curable binder mix was prepared using conventional mixing techniques in the proportions shown in Table 2, Examples 18-19 under the heading, "Binder and Carbon Mix". Graphite was added to the UV curable binder mix to comprise an electrode coating mixture using conventional mixing techniques in the proportions shown in Table 2, Examples 18-19 under the heading, "Coating". The coating mix was applied to a 26 micron thick aluminum foil current collector using a micrometer adjusted knife edge applicator set to a thickness of 75 microns and exposed to actinic radiation utilizing two (2) 400 watt/inch D bulbs powered by a Miltec MP-400 Power supply and a Fusion I250 irradiator at a speed of 200 feet per minute. During exposure to the UV radiation, the isopropyl alcohol evaporated. The cured coating was calendered to 50 micron thickness. Following curing and calendering, a two inch by two inch coupon of the coated current collector was then immersed in a mixture of 60%/40% dimethyl/ethylene carbonate and held at 140° F. for one week. At the end of the one week testing period weight gain was essentially zero and adhesion to the aluminum and the particles one to another was good.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure as claimed.

What is claimed is:

1. An electrode comprising a current collector and a polymeric layer adhered to a surface of the current collector, the polymeric layer comprising a crosslinked matrix, the crosslinked matrix including a crosslink reaction product of a rubber oligomer precursor reacted with an electron beam or actinic radiation curable crosslinking agent, the rubber oligomer precursor comprising a backbone and a reactive functionality pendent to the backbone, the reactive functionality of the precursor comprising carboxy functionality, acrylate functionality, vinyl functionality, vinyl ether functionality, meth(acrylate) functionality, or epoxy functionality, the functionality of the precursor being reacted with the crosslinking agent such that the crosslinked matrix includes the crosslinking agent covalently bonded to the rubber oligomer, the crosslinked matrix being electron beam or actinic radiation cured, the polymeric layer further comprising particulate material, wherein the polymeric layer is conductive, wherein the electrode is adjacent to an additional layer, and the additional layer comprises an electrolyte.

2. The electrode according to claim 1, wherein the rubber oligomer that is covalently bonded to crosslinking agent includes at least one of isoprene monomer units, butadiene monomer units, cyclopentadiene monomer units, ethylidene norbornene monomer units, vinyl norbornene monomer units, or combinations thereof.

3. The electrode according to claim 1, wherein the rubber oligomer precursor is a (meth)acrylated rubber oligomer having a carboxylated isoprene backbone of the formula:

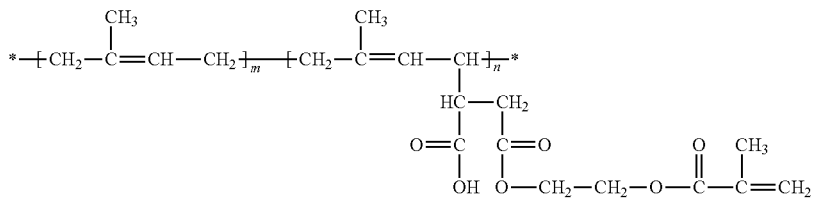

wherein m is between about 100 and about 1500, and n is between 1 and about 20.

4. The electrode according to claim 1, wherein the rubber oligomer precursor is a (meth)acrylated rubber oligomer having a carboxylated butadiene backbone of the formula:

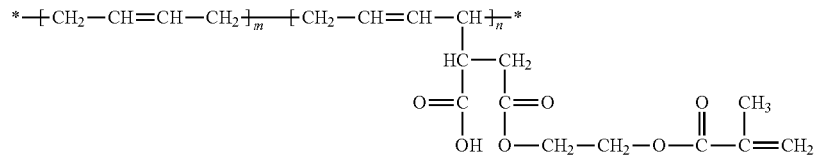

wherein m is between about 10 and about 1000, and n is between 1 and about 20.

5. The electrode according to claim 1, wherein the rubber oligomer precursor is a (meth)acrylated rubber oligomer having a butadiene backbone of the formula:

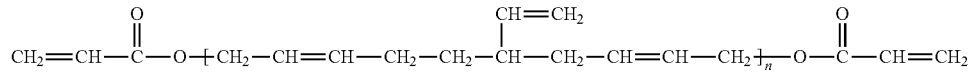

wherein n is between about 5 and about 2000.

6. The electrode according to claim 1, wherein the particulate material comprises carbon.

7. The electrode according to claim 6, wherein the carbon is graphene, activated carbon, graphite, low sulfur graphite, carbon nanotubes, or combinations thereof.

8. The electrode according to claim 1, wherein the particulate material comprises a metal oxide salt.

9. The electrode according to claim 1, wherein the polymeric layer defines a thickness between about 1 and about 500 microns.

10. A battery comprising the electrode of claim 1.

11. The battery according to claim 10, wherein the battery is a lithium ion battery.

12. An electric double layer capacitor comprising the electrode of claim 1.

13. The electrode according to claim 1, wherein the crosslinking agent is a reactive diluent.

14. The electrode according to claim 1, wherein the polymeric layer further comprises a photoinitiator.

15. An electrode comprising a current collector and a polymeric layer adhered to a surface of the current collector, the polymeric layer comprising a crosslinked matrix, the crosslinked matrix including a crosslink reaction product of a rubber oligomer precursor reacted with an electron beam or actinic radiation curable crosslinking agent, the rubber oligomer precursor comprising a backbone and a reactive functionality pendent to the backbone, the rubber oligomer precursor having a melt viscosity at 38° C. of less than about 2000 Pascal seconds, the reactive functionality of the precursor comprising carboxy functionality, acrylate functionality, vinyl functionality, vinyl ether functionality, meth(acrylate) functionality, or epoxy functionality, the functionality of the precursor being reacted with the crosslinking agent such that the crosslinked matrix includes the crosslinking agent covalently bonded to the rubber oligomer, the crosslinked matrix being electron beam or actinic radiation cured, the polymeric layer further comprising particulate material that is encapsulated within the crosslinked matrix, wherein the polymeric layer is conductive, wherein the electrode is adjacent to an additional layer, and the additional layer comprises an electrolyte.

16. The electrode according to claim 15, wherein the rubber oligomer that is covalently bonded to crosslinking agent includes at least one of isoprene monomer units, butadiene monomer units, cyclopentadiene monomer units, ethylidene norbornene monomer units, vinyl norbornene monomer units, or combinations thereof.

17. The electrode according to claim 15, wherein the rubber oligomer precursor is a (meth)acrylated rubber oligomer having a butadiene backbone of the formula:

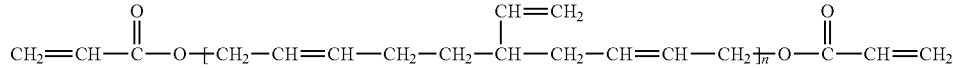

wherein n is between about 5 and about 2000.

18. The electrode according to claim 15, wherein the polymeric layer defines a thickness between about 1 and about 500 microns.

19. The electrode according to claim 15, wherein the crosslinking agent is a reactive diluent.

20. The electrode according to claim 15, wherein the polymeric layer further comprises a photoinitiator.

21. A battery comprising the electrode of claim 15.

22. The battery according to claim 21, wherein the battery is a lithium ion battery.

23. An electrode comprising a current collector and a polymeric layer adhered to a surface of the current collector, the polymeric layer comprising a crosslinked matrix, the crosslinked matrix including a crosslink reaction product of a rubber oligomer precursor reacted with an electron beam or actinic radiation curable crosslinking agent, the rubber oligomer precursor comprising a backbone and a reactive functionality pendent the backbone, the reactive functionality of the precursor comprising carboxy functionality, acrylate functionality, vinyl functionality, vinyl ether functionality, meth(acrylate) functionality, or epoxy functionality, the functionality of the precursor being reacted with the crosslinking agent such that the crosslinked matrix includes the crosslinking agent covalently bonded to the rubber oligomer, the crosslinked matrix being electron beam or actinic radiation cured, the polymeric layer further comprising particulate material, wherein the polymeric layer is conductive, wherein the particular material comprises a lithium compound.

24. The electrode according to claim 23, wherein the rubber oligomer that is covalently bonded to crosslinking agent includes at least one of isoprene monomer units, butadiene monomer units, cyclopentadiene monomer units, ethylidene norbornene monomer units, vinyl norbornene monomer units, or combinations thereof.

25. The electrode according to claim 23, wherein the rubber oligomer precursor is a (meth)acrylated rubber oligomer having a butadiene backbone of the formula:

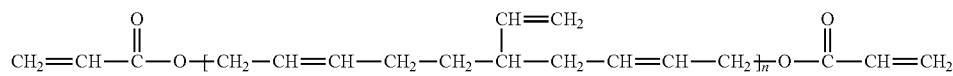

wherein n is between about 5 and about 2000.

26. The electrode according to claim 23, wherein the electrode is adjacent to an additional layer.

27. The electrode according to claim 26, wherein the additional layer is a second electrode or a separator.

28. The electrode according to claim 26, wherein the additional layer comprises an electrolyte.

29. The electrode according to claim 23, wherein the polymeric layer defines a thickness between about 1 and about 500 microns.

30. A battery comprising the electrode of claim 23.

31. The battery according to claim 30, wherein the battery is a lithium ion battery.

32. An electrode comprising a current collector and a polymeric layer adhered to a surface of the current collector, the polymeric layer comprising a crosslinked matrix, the crosslinked matrix including a crosslink reaction product of a rubber oligomer precursor reacted with an electron beam or actinic radiation curable crosslinking agent, the rubber oligomer precursor comprising a backbone and a reactive functionality pendent the backbone, the rubber oligomer precursor having a melt viscosity at 38° C. of less than about 2000 Pascal seconds, the reactive functionality of the precursor comprising carboxy functionality, acrylate functionality, vinyl functionality, vinyl ether functionality, meth(acrylate) functionality, or epoxy functionality, the functionality of the precursor being reacted with the crosslinking agent such that the crosslinked matrix includes the crosslinking agent covalently bonded to the rubber oligomer, the crosslinked matrix being electron beam or actinic radiation cured, the polymeric layer further comprising particulate material that is encapsulated within the crosslinked matrix, the particulate material comprising a lithium compound, wherein the polymeric layer is conductive.

33. The electrode according to claim 32, wherein the rubber oligomer that is covalently bonded to crosslinking agent includes at least one of isoprene monomer units, butadiene monomer units, cyclopentadiene monomer units, ethylidene norbornene monomer units, vinyl norbornene monomer units, or combinations thereof.

34. The electrode according to claim 32, wherein the rubber oligomer precursor is a (meth)acrylated rubber oligomer having a butadiene backbone of the formula:

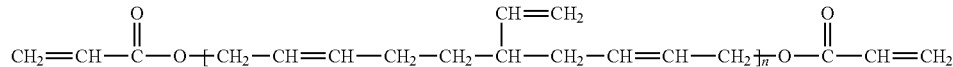

wherein n is between about 5 and about 2000.

35. The electrode according to claim 32, wherein the electrode is adjacent to an additional layer.

36. The electrode according to claim 35, wherein the additional layer is a second electrode or a separator.

37. The electrode according to claim 35, wherein the additional layer comprises an electrolyte.

38. The electrode according to claim 32, wherein the polymeric layer defines a thickness between about 1 and about 500 microns.

39. The electrode according to claim 32, wherein the crosslinking agent is a reactive diluent.

40. The electrode according to claim 32, wherein the polymeric layer further comprises a photoinitiator.

41. A battery comprising the electrode of claim 32.

42. The battery according to claim 32, wherein the battery is a lithium ion battery.

43. A battery comprising an electrode, the electrode of the battery comprising a current collector and a polymeric layer adhered to a surface of the current collector, the polymeric layer comprising a crosslinked matrix, the crosslinked matrix including a crosslink reaction product of a rubber oligomer precursor reacted with an electron beam or actinic radiation curable crosslinking agent, the rubber oligomer precursor comprising a backbone and a reactive functionality pendent the backbone, the reactive functionality of the precursor comprising carboxy functionality, acrylate functionality, vinyl functionality, vinyl ether functionality, meth(acrylate) functionality, or epoxy functionality, the functionality of the precursor being reacted with the crosslinking agent such that the crosslinked matrix includes the crosslinking agent covalently bonded to the rubber oligomer, the crosslinked matrix being electron beam or actinic radiation cured, the polymeric layer further comprising particulate material, wherein the polymeric layer is conductive.

44. The battery according to claim 43, wherein the rubber oligomer that is covalently bonded to crosslinking agent includes at least one of isoprene monomer units, butadiene monomer units, cyclopentadiene monomer units, ethylidene norbornene monomer units, vinyl norbornene monomer units, or combinations thereof.

45. The battery according to claim 43, wherein the rubber oligomer precursor is a (meth)acrylated rubber oligomer having a butadiene backbone of the formula:

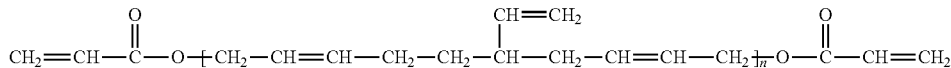

wherein n is between about 5 and about 2000.

46. The battery according to claim 43, wherein the electrode is adjacent to an additional layer.

47. The battery according to claim 46, wherein the additional layer is a second electrode or a separator.

48. The battery according to claim 43, wherein the polymeric layer defines a thickness between about 1 and about 500 microns.

49. The battery according to claim 43, wherein the battery is a lithium ion battery.

50. A battery comprising an electrode, the electrode of the battery comprising a current collector and a polymeric layer adhered to a surface of the current collector, the polymeric layer comprising a crosslinked matrix, the crosslinked matrix including a crosslink reaction product of a rubber oligomer precursor reacted with an electron beam or actinic radiation curable crosslinking agent, the rubber oligomer precursor comprising a backbone and a reactive functionality pendent the backbone, the rubber oligomer precursor having a melt viscosity at 38° C. of less than about 2000 Pascal seconds, the reactive functionality of the precursor comprising carboxy functionality, acrylate functionality, vinyl functionality, vinyl ether functionality, meth(acrylate) functionality, or epoxy functionality, the functionality of the precursor being reacted with the crosslinking agent such that the crosslinked matrix includes the crosslinking agent covalently bonded to the rubber oligomer, the crosslinked matrix being electron beam or actinic radiation cured, the polymeric layer further comprising particulate material that is encapsulated within the crosslinked matrix, wherein the polymeric layer is conductive.

51. The battery according to claim 50, wherein the rubber oligomer that is covalently bonded to crosslinking agent includes at least one of isoprene monomer units, butadiene monomer units, cyclopentadiene monomer units, ethylidene norbornene monomer units, vinyl norbornene monomer units, or combinations thereof.

52. The battery according to claim 50, wherein the rubber oligomer precursor is a (meth)acrylated rubber oligomer having a butadiene backbone of the formula:

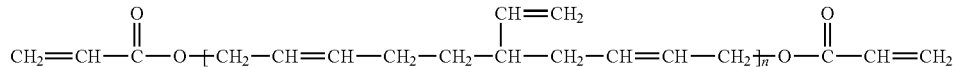

wherein n is between about 5 and about 2000.

53. The battery according to claim 50, wherein the electrode is adjacent to an additional layer.

54. The battery according to claim 53, wherein the additional layer is a second electrode or a separator.

55. The battery according to claim 50, wherein the polymeric layer defines a thickness between about 1 and about 500 microns.

56. The battery according to claim 50, wherein the crosslinking agent is a reactive diluent.

57. The battery according to claim 50, wherein the polymeric layer further comprises a photoinitiator.

58. The battery according to claim 50, wherein the battery is a lithium ion battery.

* * * * *